UNITED STATES PATENT OFFICE.

CARLO ROSSI, OF LEGNANO, ITALY.

PROCESS OF PRODUCING POTASH CONTAINING FERTILIZERS.

1,401,648.  Specification of Letters Patent.  Patented Dec. 27, 1921.

No Drawing.  Application filed April 24, 1919. Serial No. 292,486.

*To all whom it may concern:*

Be it known that I, CARLO ROSSI, subject of the King of Italy, resident of Lagnano, in the Kingdom of Italy, have invented new and useful Improvements in the Processes of Producing Potash Containing Fertilizers, of which the following is a specification.

Serpek's studies and patents are well known, by which large quantities of nitrogen can be fixed in the form of aluminium nitrid by heating aluminium oxid (bauxite) and carbon to 1800°–2000° C. in the presence of nitrogen.

From the studies of W. H. Ross it further results that nitrogen, in relatively small quantities however, can be fixed from feldspars by heating the feldspars in conjunction with carbon and nitrogen to a high temperature (1200° to 1400° C.). The nitrogen is fixed in the ratio of 3 to 5%, while the potash values are volatilized and can be separately recovered.

The latter process involves a very material expense owing to the carbon which must be added in the ratio of 50 to 60% of the feldspar weight and owing to the heating of the mass; accordingly the method is not economical.

The object of the present invention is to enable the recovery of potash values from feldspar rocks or volcanic rocks or from potassiferous ores and to simultaneously produce nitrogenous fertilizer and nitrogenous potassiferous fertilizer of a high value. The invention contemplates the treatment of various potassiferous rocks or minerals such as feldspar, orthoclase, leucite, granite, volcanic ash, etc.

It is well known that if calcium carbid be heated in the presence of nitrogen, the carbid absorbs the nitrogen and is transformed into calcium cyanamid, carbon being simultaneously separated according to the equation:

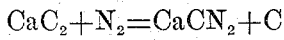
$$CaC_2 + N_2 = CaCN_2 + C$$

The liberated carbon remains mingled with the calcium cyanamid and is entirely lost, since it serves no purpose as a manure, while a heavy expense has been incurred to fix this carbon to lime in the form of calcium carbid.

The applicant has found that if finely ground potassiferous rock be mingled with calcium carbid and the mixture heated in the presence of nitrogen, most desirably in a stream or current of nitrogen exactly as in the well known process for the production of calcium cyanamid, a reaction takes place between the carbon set free by the production of calcium cyanamid, the free lime contained in the calcium carbid and the feldspar or other potassiferous volcanic rock, nitrogen being absorbed and potash values volatilized; the volatilized potash values can be recovered in their entirety. The nitrogen absorption may reach as much as 6 to 8% of the weight of the potash-containing rock used and 50 to 70% of the aluminium weight contained in the said rock.

By mixing coal with the feldspar or other potassiferous rock employed and thus supplementing the carbon set free in the formation of calcium cyanamid, a larger proportion of potassiferous rock may be employed in mixture with calcium carbid, and a greater absorption of nitrogen thus obtained. To the same end lime may be added to the mixture as such to supplement that present in the calcium carbid.

The nitrogen is fixed by the feldspar in a complex form that has not yet been accurately determined; perhaps complex nitrids are formed, but at all events the nitrogen thus fixed is assimilable by plants.

The potash values, as stated, are volatilized in their entirety and can be recovered in the ratio of 100% of the potash contents of the rock. The best results are obtained when carbon, lime, and volcanic rock are mingled in the ratio of 2:4:4.

By suitably adjusting the temperature the potash volatilization can be avoided, in which case the potash values remain mingled with the nitrogenous product obtained.

It is already known that in the manufacture of calcium cyanamid from calcium carbid and nitrogen a considerable amount of heat is developed, and that in order to bring about the reaction it is sufficient to start the heating of the mass because the reaction once it has been started, goes on by itself without any addition of heat from the outside.

Now, the heat set free by the formation of calcium cyanamid is sufficient also to bring about the reaction between the potassiferous rock, carbon, lime and nitrogen.

Having now described my invention and how the same is to be carried out, what I claim as my invention, is:

1. The process of producing potassiferous fertilizers which comprises extracting potash values from potassiferous rocks and minerals, such as leucite, volcanic ash, feldspar, orthoclase, granite, etc., by subjecting a mixture of such a rock or mineral with calcium carbid to high temperature in a stream of nitrogen, the temperature being high enough to volatilize potash values which are separately recovered, while nitrogen is fixed by the calcium carbid with formation of calcium cyanamid and by the feldspar with formation of complex nitrogeneous compounds assimilable by plants.

2. The process as set forth in claim 1, in which the potassiferous rock or mineral employed, such as feldspar, is mixed with coal to supplement the carbon set free in the formation of calcium cyanamid, whereby the proportion of such potassiferous rock or mineral in mixture with calcium carbid may be increased and a larger absorption of nitrogen by such rock or mineral may be obtained.

3. The process as set forth in claim 1, in which lime is added as such to the mixture to supplement that already contained in the calcium carbid.

4. The process as set forth in claim 2, in which lime is added as such to the mixture to supplement that already contained in the calcium carbid.

5. The process of preparing valuable products from potassiferous minerals which comprises subjecting a mixture of such a mineral and an alkaline earth carbid, in the presence of nitrogen, to a temperature sufficiently high to effect fixation of nitrogen and production of compounds containing potash values in form available as plant food.

CARLO ROSSI.